United States Patent
O'Rourke et al.

(10) Patent No.: US 11,008,071 B2
(45) Date of Patent: May 18, 2021

(54) ROTARY CHAIN JACK THAT MAINTAINS TENSION IN A MOORING LINE/CHAIN

(71) Applicants: Charlie O'Rourke, Goleta, CA (US); Tom Miller, Goletta, CA (US); Nick Atallah, Goleta, CA (US); Matt Frowiss, Goleta, CA (US); Kanghua Sun, Ventura, CA (US)

(72) Inventors: Charlie O'Rourke, Goleta, CA (US); Tom Miller, Goletta, CA (US); Nick Atallah, Goleta, CA (US); Matt Frowiss, Goleta, CA (US); Kanghua Sun, Ventura, CA (US)

(73) Assignee: Bardex Corporation, Goleta, CA (US)

(*) Notice: Subject to any disclaimer, the term of this patent is extended or adjusted under 35 U.S.C. 154(b) by 838 days.

(21) Appl. No.: 15/431,145

(22) Filed: Feb. 13, 2017

(65) Prior Publication Data

US 2017/0259886 A1    Sep. 14, 2017

Related U.S. Application Data

(60) Provisional application No. 62/294,759, filed on Feb. 12, 2016.

(51) Int. Cl.
| | |
|---|---|
| *B63B 21/18* | (2006.01) |
| *B66D 5/34* | (2006.01) |
| *B66D 5/08* | (2006.01) |
| *B63B 21/22* | (2006.01) |
| *B63B 21/50* | (2006.01) |

(Continued)

(52) U.S. Cl.
CPC ............ *B63B 21/18* (2013.01); *B63B 21/22* (2013.01); *B63B 21/50* (2013.01); *B66D 1/72* (2013.01); *B66D 5/08* (2013.01); *B66D 5/34* (2013.01); *F16H 55/303* (2013.01)

(58) Field of Classification Search
CPC ......... B63B 21/18; B63B 21/22; B63B 21/50; B66D 5/08; B66D 5/34
See application file for complete search history.

(56) References Cited

U.S. PATENT DOCUMENTS 3,566,667 A * 3/1971 Hagerty .................. B21D 1/12
 72/444
3,754,432 A * 8/1973 Hagerty .................. B21D 1/14
 72/447

(Continued)

FOREIGN PATENT DOCUMENTS

WO    2004065203 A1    8/2004

OTHER PUBLICATIONS

International Search Report and Written Opinion dated Jun. 6, 2017 (issued in PCT Application No. PCT/US2017/017648) [15 pages].

(Continued)

*Primary Examiner* — S. Joseph Morano
*Assistant Examiner* — Jovon E Hayes
(74) *Attorney, Agent, or Firm* — Michael S. McCoy; Amatong McCoy LLC

(57) ABSTRACT

A rotary chain jack may include a frame, a dual chain wheel rotatably coupled to the frame, and a stopper assembly mechanically coupled to the frame. The stopper assembly may include latches. The stopper assembly may be positioned to selectively engage a chain passing over the dual chain wheel. The rotary chain jack may be used to moor offshore structures.

27 Claims, 13 Drawing Sheets

(51) Int. Cl.
*B66D 1/72* (2006.01)
*F16H 55/30* (2006.01)

(56) References Cited

U.S. PATENT DOCUMENTS

| | | | | |
|---|---|---|---|---|
| 2005/0022712 | A1* | 2/2005 | Gundersen | B63B 21/14 |
| | | | | 114/230.2 |
| 2008/0190344 | A1* | 8/2008 | Hystad | B63B 21/18 |
| | | | | 114/200 |
| 2013/0116075 | A1* | 5/2013 | Miller | F16H 55/30 |
| | | | | 474/155 |
| 2013/0298521 | A1* | 11/2013 | Sun | B63B 21/20 |
| | | | | 59/85 |
| 2013/0312649 | A1* | 11/2013 | Tomas | G01N 3/08 |
| | | | | 114/200 |
| 2015/0014614 | A1* | 1/2015 | Lisland | B66D 5/34 |
| | | | | 254/325 |
| 2017/0259886 | A1* | 9/2017 | O'Rourke | B63B 21/50 |

OTHER PUBLICATIONS

Notification of Transmittal of International Preliminary Report on Patentability dated Aug. 23, 2018, during the prosecution of International Application No. PCT/US2017/017648. [12 pages].

* cited by examiner

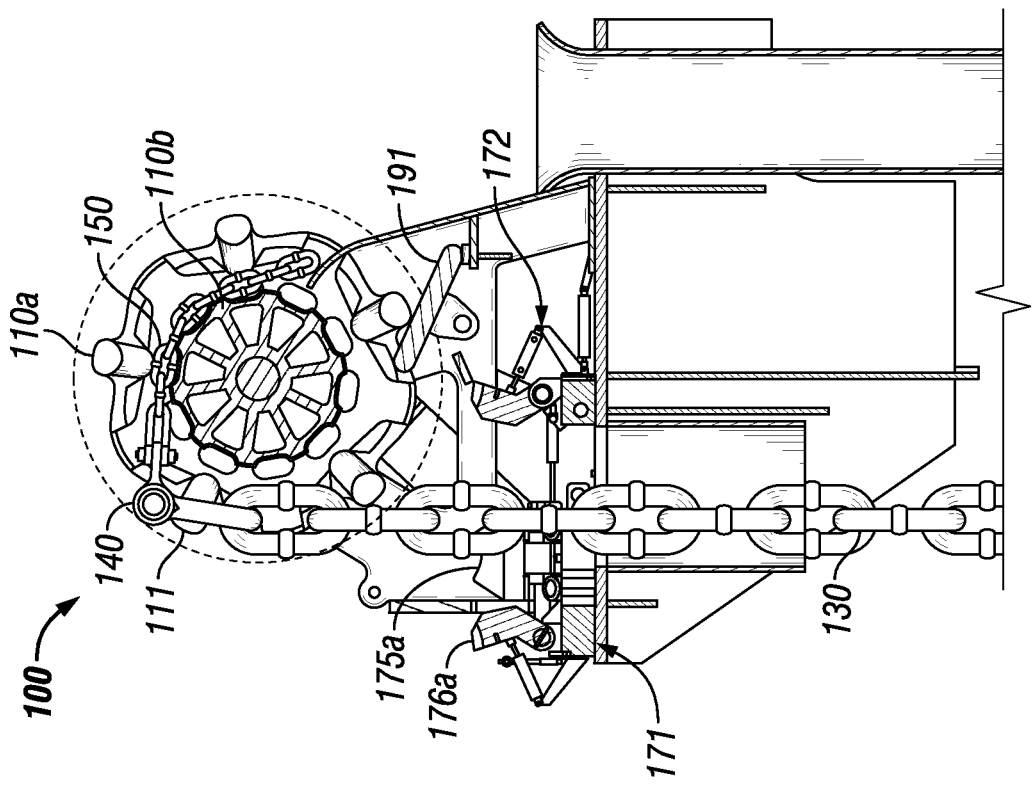
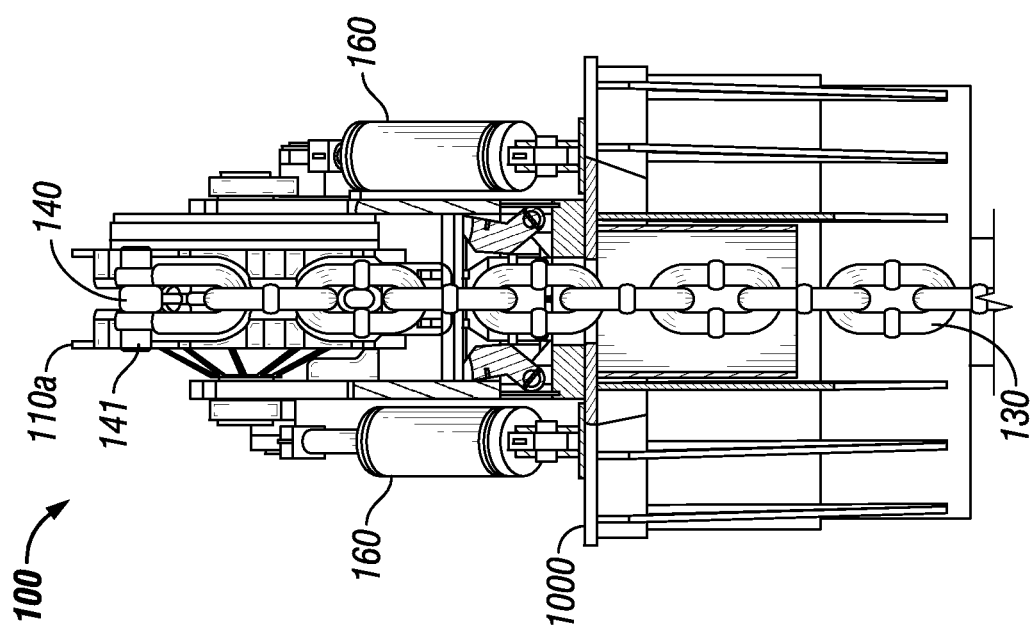

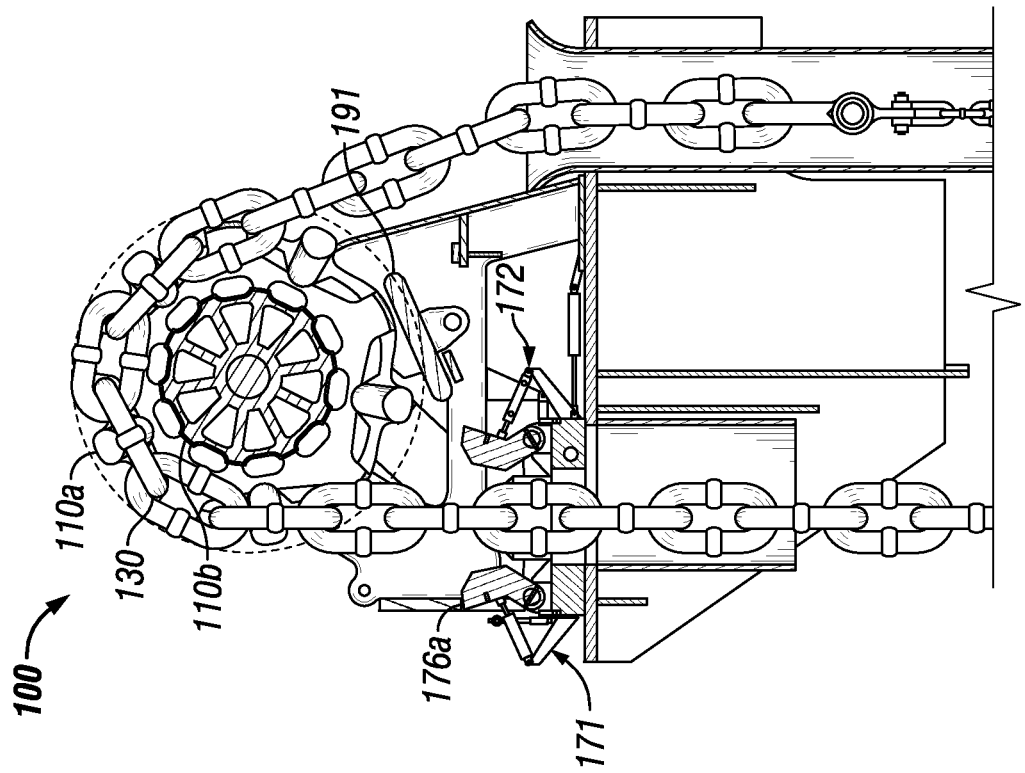
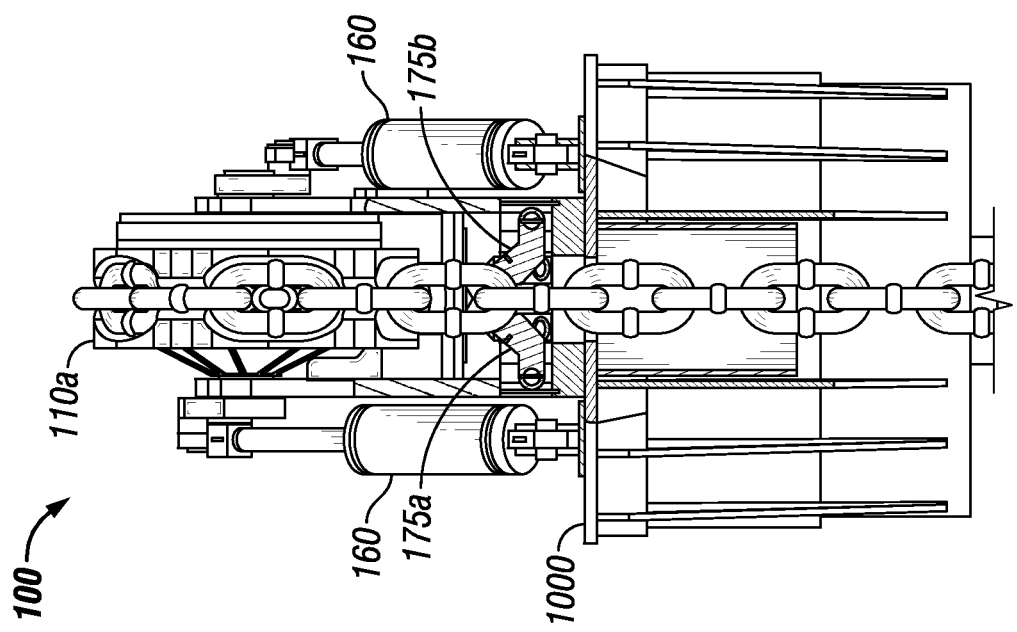

ROTARY CHAIN JACK THAT MAINTAINS TENSION IN A MOORING LINE/CHAIN

CROSS-REFERENCE TO RELATED APPLICATIONS

This application claims priority to, as a non-provisional of, U.S. Provisional Patent Application No. 62/294,759, filed on Feb. 12, 2016, the entirety of which is incorporated herein by reference.

BACKGROUND

Offshore mooring systems are typically used to maintain offshore structures in position (i.e., on station) within specified tolerances. Offshore structures, such as floating production, drilling or construction platforms or spar buoys, generally are moored in a desired location through the use of mooring lines (e.g., chains or cables) secured between the offshore structure and anchors on the ocean floor. Mooring systems operate to provide restoring forces that act against environmental forces (e.g., wind, waves and currents) that move offshore structures out of position (off station). Enhanced control over the positioning of mooring lines may correspondingly enhance control over the positioning of associated offshore structures.

BRIEF SUMMARY

An embodiment of the present disclosure relates to a rotary chain jack. The rotary chain jack may include a frame, a dual chain wheel rotatably coupled to the frame, and a stopper assembly mechanically coupled to the frame. The stopper assembly may include latches. The stopper assembly may be positioned to selectively engage a chain passing over the dual chain wheel.

Another embodiment of the present disclosure relates to an offshore structure including an offshore floating vessel, and one or more rotary chain jacks coupled to a surface of the offshore floating vessel. Each rotary chain jack may include a frame, a dual chain wheel rotatably coupled to the frame, and a stopper assembly mechanically coupled to the frame. The stopper assembly may include latches. The stopper assembly may be positioned to selectively engage a chain passing over the dual chain wheel.

Another embodiment of the present disclosure relates to a method for mooring an offshore structure. The method may include coupling a rotary chain jack to the offshore structure. The rotary chain jack may include a frame, a dual chain wheel rotatably coupled to the frame, and a stopper assembly mechanically coupled to the frame. The stopper assembly may include latches. The method may include coupling a messenger chain to an anchor chain. The anchor chain may be coupled to an anchor, and the messenger chain may be operatively coupled with the dual chain wheel. The method may include positioning the anchor chain by rotating the dual chain wheel to increase or decrease tension on the anchor chain, and selectively engaging the anchor chain with the stopper assembly during positioning of the anchor chain.

An embodiment of the present disclosure relates to a stopper assembly for use with a chain jack for mooring an offshore structure. The stopper assembly may include an inboard stopper assembly having one or more latches, and an outboard stopper assembly having one or more latches. The inboard stopper assembly and the outboard stopper assembly may be movable relative to each other to selectively position the stopper assembly in an open configuration or a closed configuration about an anchor chain. When the stopper assembly is in the closed configuration, the latches may be positioned to selectively grip an anchor chain passing through the stopper assembly.

The foregoing has outlined rather broadly the features and technical advantages of the present disclosure in order that the detailed description that follows may be better understood. Additional features and advantages will be described hereinafter, which form the subject of the claims. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure. The novel features which are believed to be characteristic of the products, systems, and methods, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

So that the manner in which the features and advantages of the system, products, and/or method so of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 5C is a perspective view of a stopper assembly of the rotary chain jack of FIG. 5A, where the stopper assembly is in an open configuration and is disengaged from a mooring line passing there-through.

FIG. 6A is a sectional, front view of a rotary chain jack during haul-in, where a shackle of the mooring line is in transition in accordance with certain embodiments of the present disclosure.

FIG. 6B is a sectional, side view of the rotary chain jack of FIG. 6A.

FIG. 6C is a perspective view of the stopper assembly of the rotary chain jack of FIG. 6A, where the stopper assembly is in an open configuration and is disengaged from the mooring line passing there-through.

FIG. 7A is a sectional, front view of a rotary chain jack during haul-in, where a top chain of the mooring line is being hauled-in in accordance with certain embodiments of the present disclosure.

FIG. 7B is a sectional, side view of the rotary chain jack of FIG. 7A.

FIG. 7C is a perspective view of the stopper assembly of the rotary chain jack of FIG. 7A, where the stopper assembly is in a closed configuration and main latches of the stopper assembly are engaged with the top chain of the mooring line passing there-through.

Products and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice. For example, many of the exemplary descriptions provided herein are concerned with training pants for infants and young children or diapers. Aspects of the concepts described may, however, be equally applicable to designs for and the manufacture of adult incontinence products and other similar products.

DETAILED DESCRIPTION

The foregoing has outlined rather broadly the features and technical advantages of the present disclosure in order that the detailed description that follows may be better understood. Additional features and advantages will be described hereinafter, which form the subject of the claims. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure. The novel features which are believed to be characteristic of the products, systems, and methods, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The present disclosure relates generally to a rotary chain jack having a stopper assembly that is positioned to selectively engage with a mooring line, a method of use of the rotary chain jack, an offshore structure having the rotary chain jack, and to a stopper assembly for use with rotary chain jacks on offshore structures.

Figure 1:
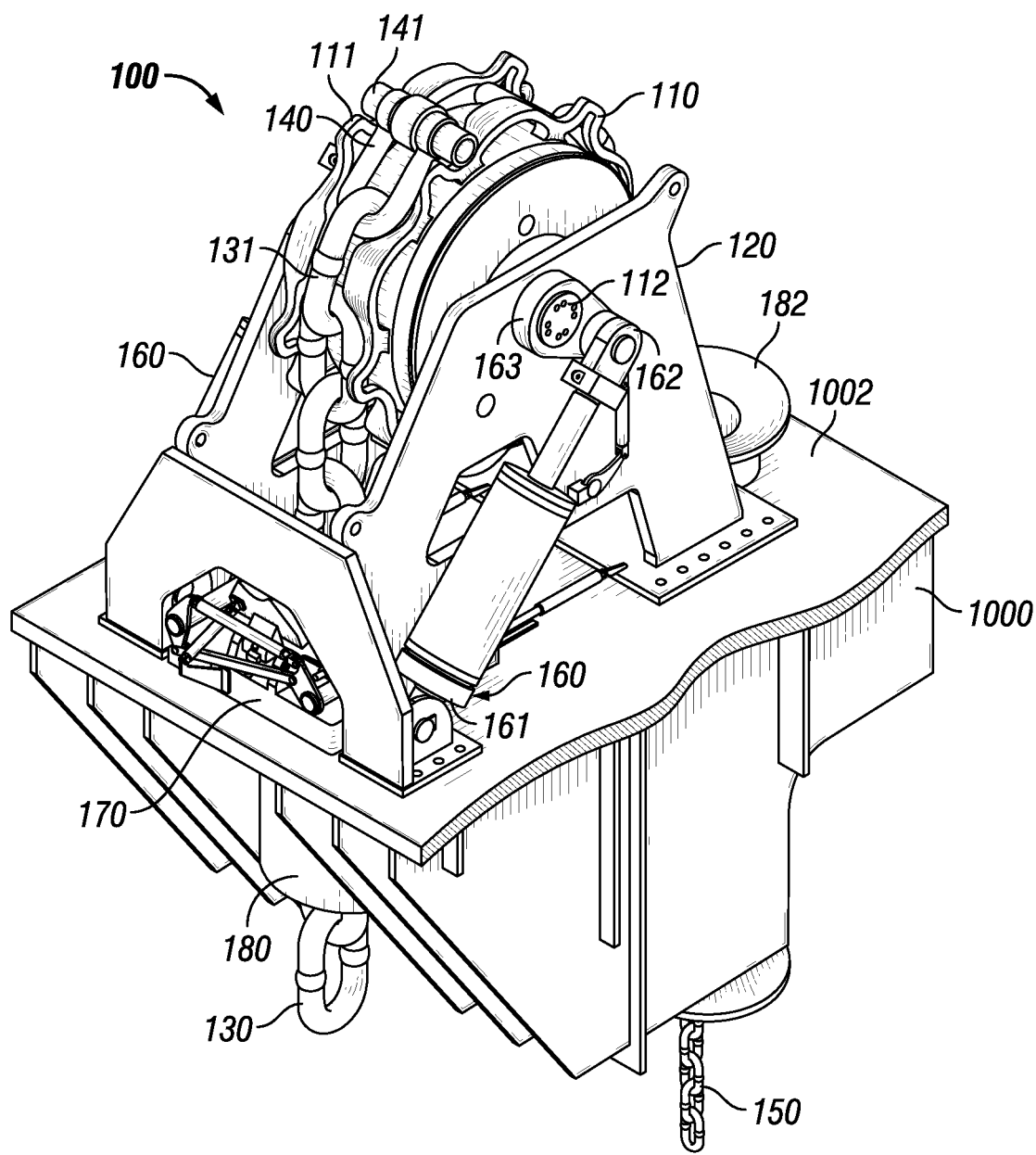
FIG. 1 is a perspective view of a rotary chain jack in accordance with certain embodiments of the present disclosure.

FIG. 1 is a perspective view of rotary chain jack 100 in accordance with certain embodiments. Rotary chain jack 100 includes dual chain wheel 110. Dual chain wheel 110 may be mechanically coupled to frame 120 of rotary chain jack 100. For example and without limitation, dual chain wheel 110 may include axle 112 engaged within a through-hole (not shown) of frame 120. Frame 120 may also be mechanically coupled to a portion of offshore structure 1000, such as via bolting, welding, or any other such method well known to those of ordinary skill in the art. Offshore structure 1000 may be, for example and without limitation, an offshore floating platform, such as for offshore drilling and production of hydrocarbons or for construction, or a ship. In some embodiments, frame 120 may retain dual chain wheel 110 in a position that is raised above top surface 1002 of offshore structure 1000, allowing dual chain wheel 110 to rotate relative to frame 120 without contacting top surface 1002 of offshore structure 1000. Offshore structure 1000 may include inboard hawse pipe 182 and outboard hawse pipe 180.

Rotary chain jack 100 may include a mooring line, here shown as chain 130. While mooring line is shown and described herein as a chain, mooring line may be a chain, wire rope, fiber rope, or any combination thereof. Top chain link 131 of chain 130 may be mechanically coupled with shackle 140. In the position of the mooring line, as shown in FIG. 1, shackle 140 is mechanically coupled with dual chain wheel 110. For example, shackle tabs 141 of shackle 140 are depicted as mechanically coupled with teeth 111 of dual chain wheel 110. Shackle 140 may be a back to back (B2B) shackle connector. Shackle 140 may be mechanically coupled to messenger chain 150, as shown and described in more detail below.

Rotary chain jack 100 may include jack cylinders 160. At first end 161 of jack cylinders 160, jack cylinders 160 may be mechanically coupled, such as via bolting, to frame 120, as shown. In other embodiments, first end 161 may be mechanically coupled to a portion of offshore structure 1000. Second end 162 of jack cylinders 160 may be mechanically coupled, such as via bolting, to crank arm 163. Crank arm 163 may be mechanically coupled with axle 112, such as via pinning, press fit, or any other manner well known to those of ordinary skill in the art. In operation, actuation of jack cylinders 160 rotates crank arm 163, rotation of crank arm 163 rotates axle 112, rotation of axle 112 rotates dual chain wheel 110, and rotation of dual chain wheel 110 either deploys or hauls in chain 130 depending upon the direction of rotation of dual chain wheel 110.

Rotary chain jack 100 may include stopper assembly 170. Stopper assembly 170 may be positioned, such as on frame 120, such that stopper assembly 170 may selectively engage chain 130 for gripping of chain 130, and selectively disengage from chain 130 for allowing passage of chain 130, such as during deployment of hauling in of chain 130.

Stopper assembly 170 may couple with frame 120 such that stopper assembly 170 is positioned to engage chain 130 on an outboard side of dual chain wheel 110, intermediate of dual chain wheel 110 and an anchor (not shown) engaged with chain 130. In some embodiments, one or more portions of rotating chain jack 100 may be formed of steel, for example.

Figure 2:
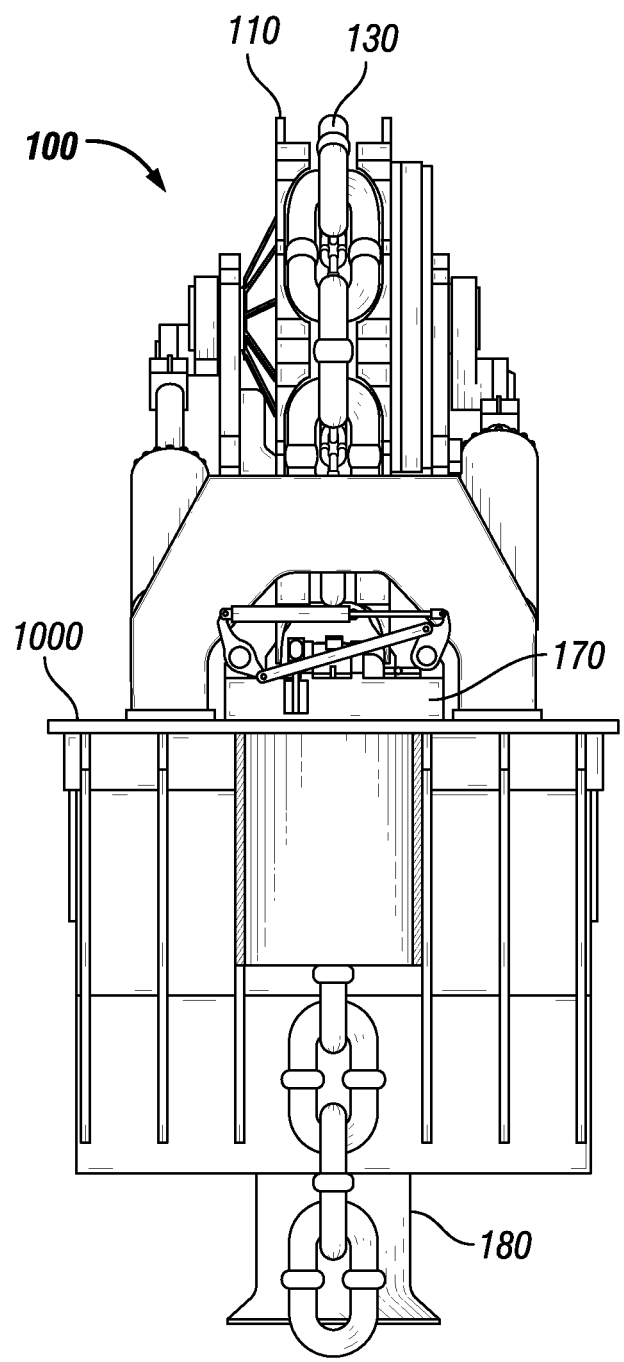
FIG. 2 is a front view of the rotary chain jack of FIG. 1.
Figure 3:
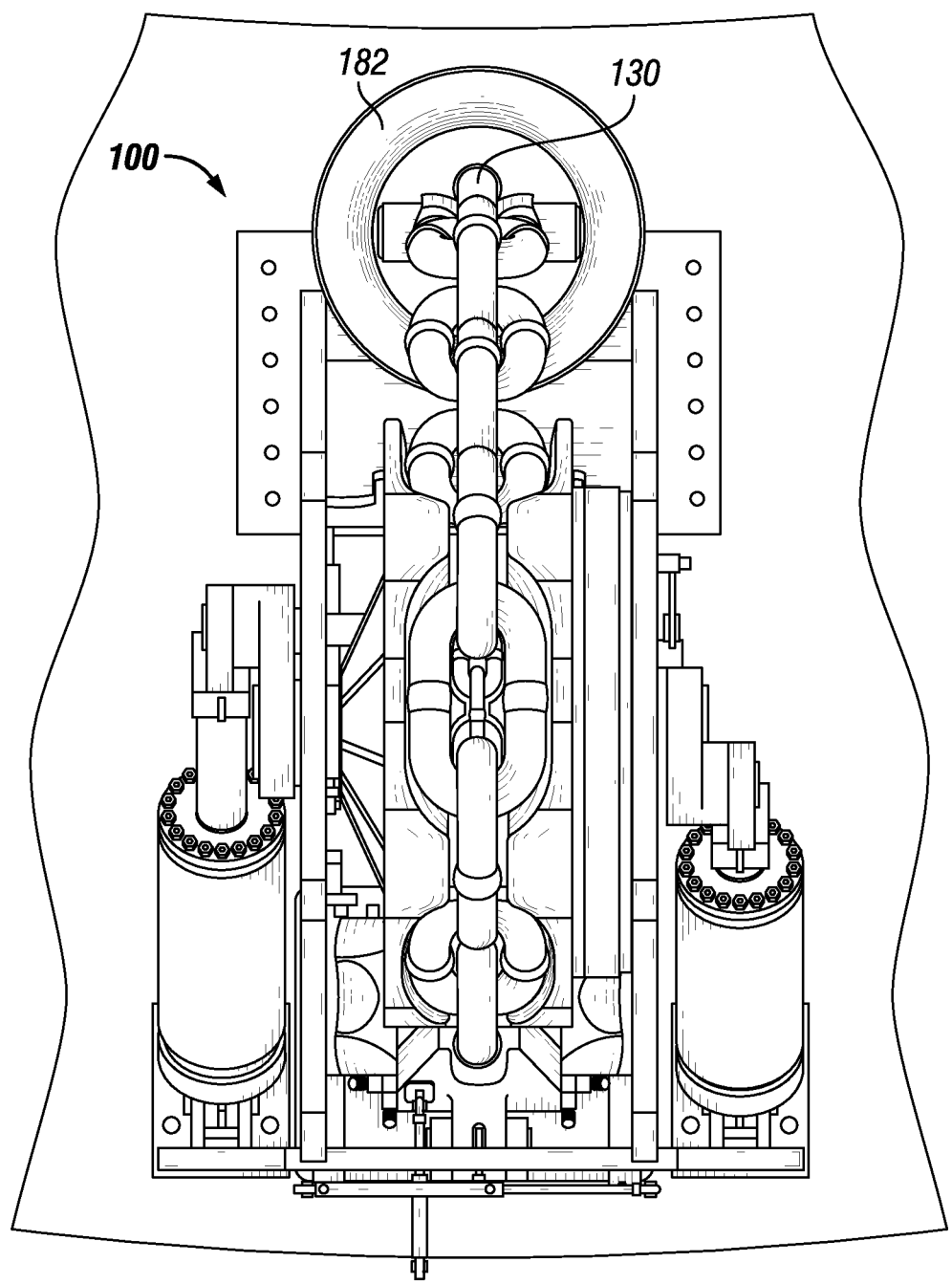
FIG. 3 is a top view of the rotary chain jack of FIG. 1.
Figure 4:
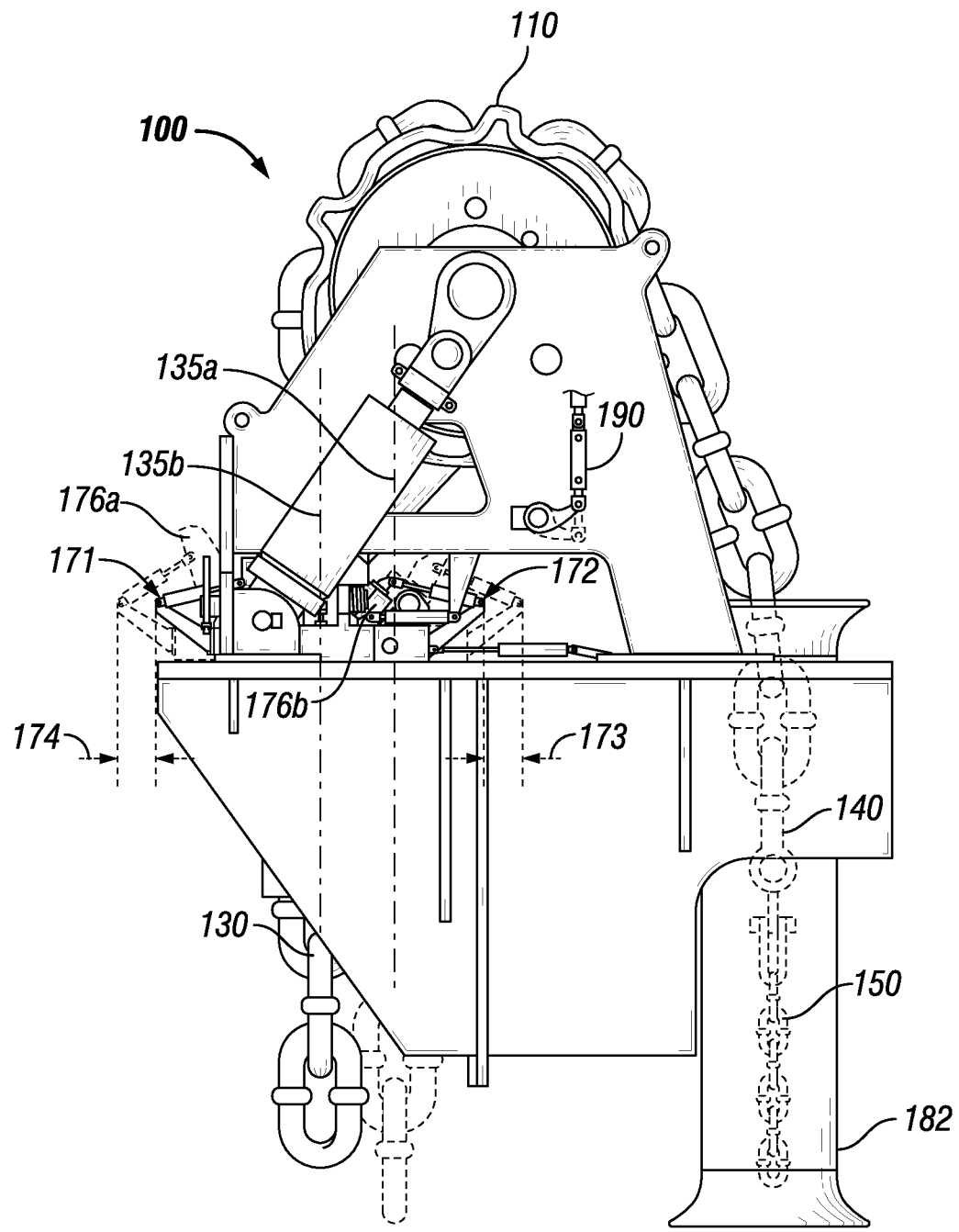
FIG. 4 is a side view of the rotary chain jack of FIG. 1.

With reference to FIGS. 2-4, as chain 130 is deployed outboard from offshore structure 1000, chain 130, shackle 140, and messenger chain 150 may pass through inboard hawse pipe 182, pass over dual chain wheel 110, and pass through outboard hawse pipe 180. Stopper assembly 170 may be positioned adjacent outboard hawse pipe 180, and may include outboard stopper assembly 171 and inboard stopper assembly 172. Outboard stopper assembly 171 and inboard stopper assembly 172 may both by hydraulically actuated to be selectively arranged in an open configuration or a closed configuration. FIG. 4 shows sliding stroke distance 173 and sliding stroke distance 174 when auxiliary latches 176b and 176a and stopper assemblies 171 and 172 are in an open position and when auxiliary latches 176b and 176a and stopper assemblies 171 and 172 are in a closed configuration, respectively, which are discussed and described in more detail below. Chain 130 may be positioned to be aligned along chain line 135a when mooring line is being hauled in on inner chain wheel 110b (shown and described in FIGS. 5A and 5B), or along chain line 135b when mooring line is being hauled in on outer chain wheel 110a (shown and described in FIGS. 5A and 5B.

Rotary chain jack 100 may also include chain wheel latch cylinder 190 for hydraulic actuation of chain wheel latch, as shown and described below.

Figure 5B:
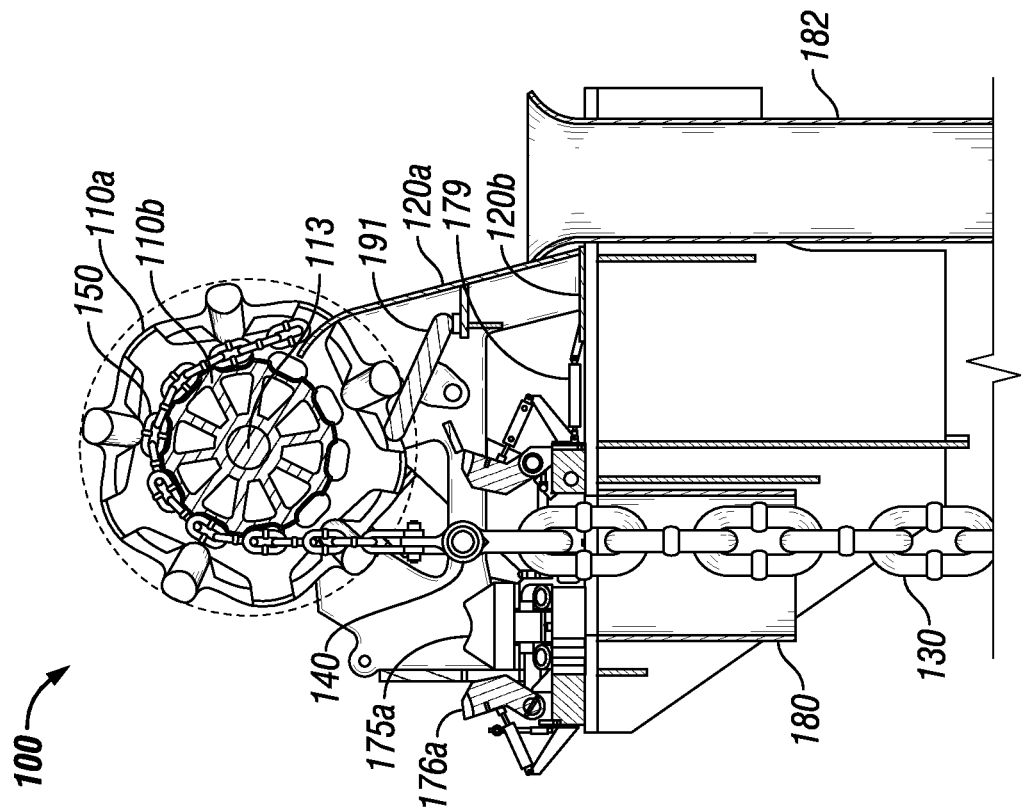
FIG. 5B is a sectional, side view of the rotary chain jack of FIG. 5A.
Figure 5A:
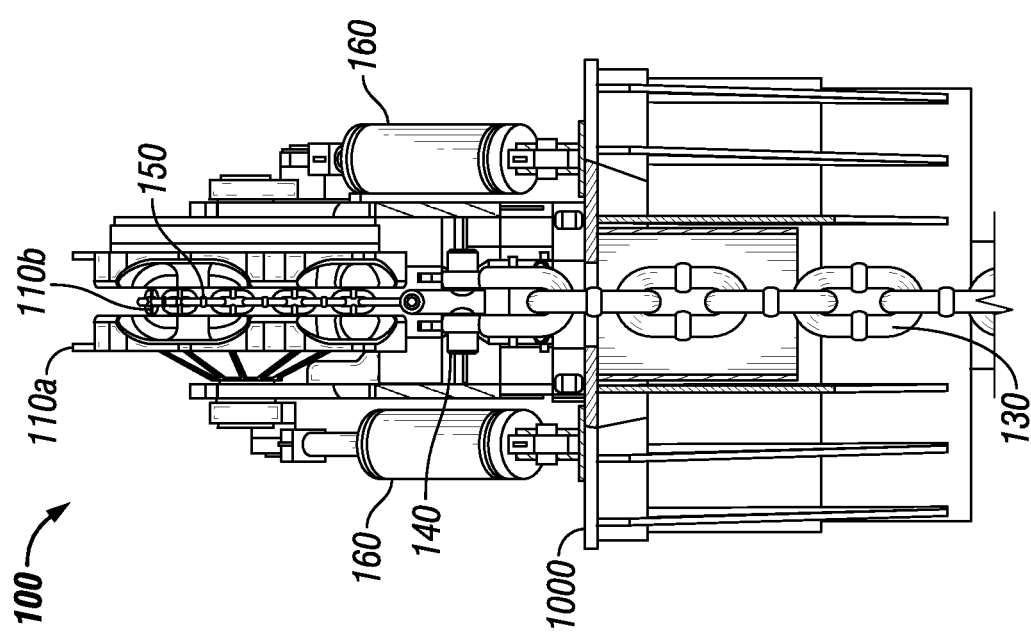
FIG. 5A is a sectional, front view of a rotary chain jack during haul-in of a messenger chain in accordance with certain embodiments of the present disclosure.
Figure 5C:
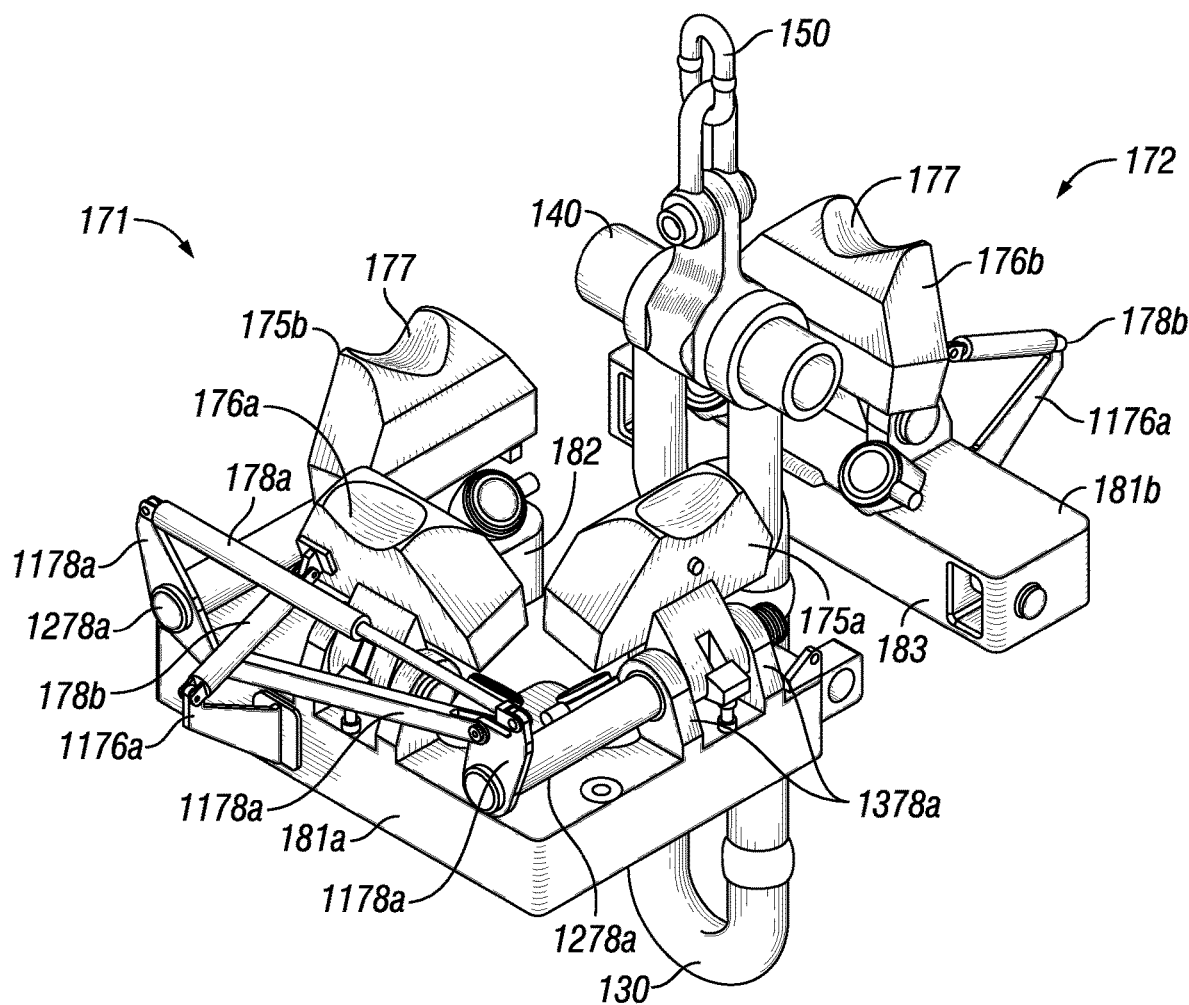

FIGS. 5A-5C depict rotary chain jack 100 during haul-in of messenger chain 150. Dual chain wheel 110 may include outer chain wheel 110a mechanically coupled with inner chain wheel 110b. Outer chain wheel 110a and inner chain wheel 110b may be a single piece construction. For example, dual chain wheel 110 may be a single wheel having an inner surface defining inner chain wheel 110b adapted to receive messenger chain 150, and an outer surface defining outer chain wheel 110a adapted to receive chain 130. Outer chain wheel 110a may have a larger diameter than inner chain wheel 110b. Outer chain wheel 110a and inner chain wheel 110b may rotate about the same rotation axis, rotation axis 113. In operation, hydraulic actuation of jack cylinders 160 rotates both outer chain wheel 110a and inner chain wheel 110b. During haul-in of messenger chain 150, chain wheel latch 191 may be engaged with dual chain wheel 110, and may ratchet as dual chain wheel 110 rotates. As discussed herein, chain wheel latch 191 may be actuated for engagement or disengagement from dual chain wheel 110 by chain wheel latch cylinder 190 (as shown in FIG. 4). Messenger chain 150 may be engaged with inner wheel 110b. Rotation of inner chain wheel 110b may pull messenger chain 150 inboard, such that messenger chain 150 passes over inner chain wheel 110b and toward inboard hawse pipe 182. For example and without limitation, portion of frame 120a may guide messenger chain 150 from inner chain wheel 110b to inboard hawse pipe 182.

Figure 7C:
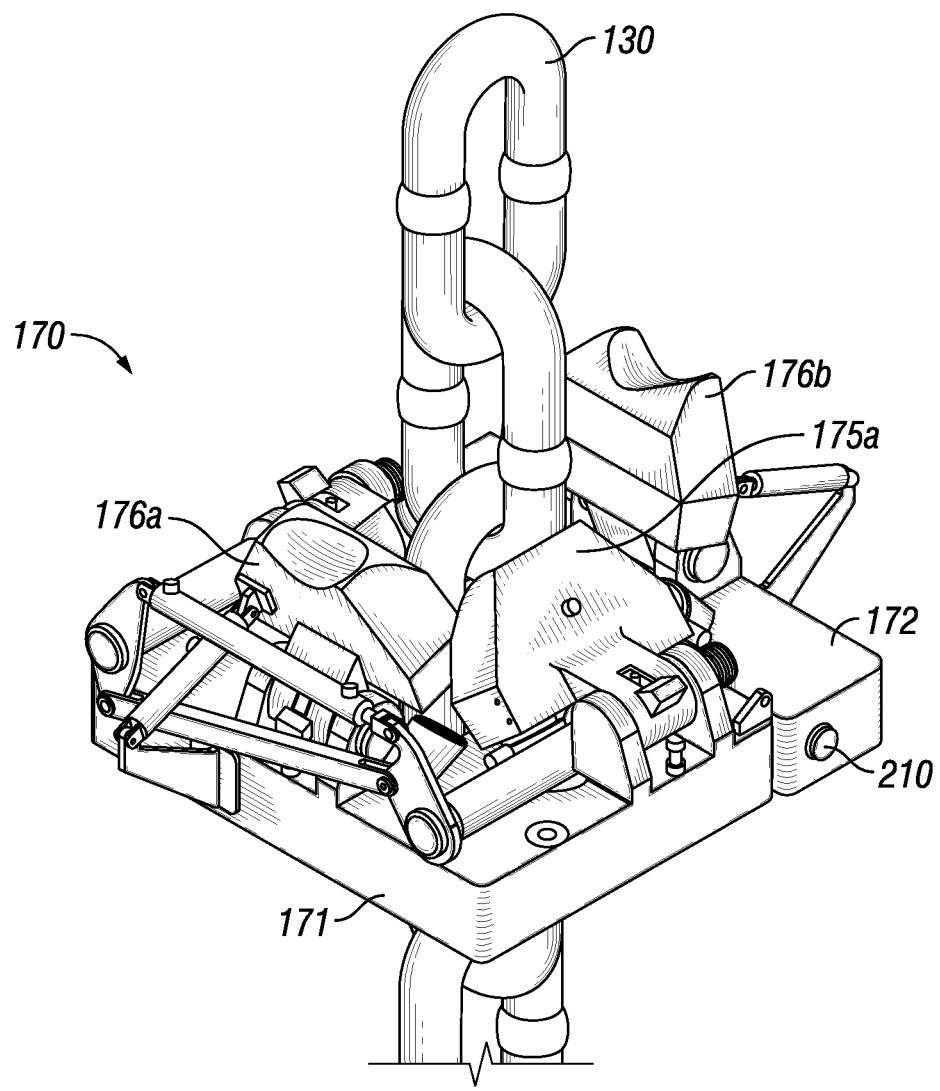

Stopper assembly 170, including outboard stopper assembly 171 and inboard stopper assembly 172, may include latches adapted to engage and grip chain 130. For example and without limitation, stopper assembly 170 may include main latches 175a and 175b and auxiliary latches 176a and 176b. As shown in FIG. 5C, stopper assembly 170 includes two main latches 175a and 175b and two auxiliary latches 176a and 176b. Stopper assembly 170 is not limited to having two main latches 175a and 175b and two auxiliary latches 176a and 176b, and may have any number of main latches 175a and 175b and auxiliary latches 176a and 176b adapted to engage and grip chain 130. Main latches 175a and 175b and auxiliary latches 176a and 176b may be adapted to engage and grip chain 130 via gripping surfaces 177. In some embodiments, gripping surfaces 177 may be concave surfaces formed in main latches 175a and 175b and auxiliary latches 176a and 176b, and may be shaped and arranged to engage about and grip chain 130. Main latches 175a and 175b may be actuated to move between a closed, latched configuration (as shown in FIG. 7C) and an open, unlatched configuration (as shown in FIG. 5C) by actuation of main latch cylinder 178a. Also, auxiliary latches 176a and 176b may be actuated to move between a closed, latched configuration (as shown in FIG. 8C) and an open, unlatched configuration (as shown in FIG. 5C) by actuation of auxiliary latch cylinders 178b. Each main latch cylinder 178a may be coupled, at one end, to one of main latches 175a and 175b, and coupled at the opposite end to a portion of stopper assembly frame, including outboard frame 181a and/or inboard frame 181b. For example and without limitation, main latch cylinder 178a may be coupled with one or more main latch brackets 1178a. Main latch brackets 1178a may be coupled with main latch axles 1278a. Main latch brackets 1178a may include a bell crank associated with each main latch (175a and 175b) and a lower arm that is connected to the bell crank on the same axle side as latch cylinder 178a (shown with respect to latch 175a in FIG. 5C) and to the bell crank on the opposite axle side as latch cylinder 178a (shown with respect to latch 175b in FIG. 5C). The lower arm of main latch brackets 1178a ensures latches 175a and 175b open equally. When main latch cylinder 178a actuates, main latch 178a may force main latch brackets 1178a to move, thereby forcing rotation of main latch axles 1278a. Rotation of main latch axles 1278a may move main latches 175a and 175b between the open, unlatched configuration and the closed, latched configuration. Main latches 175a and 175b may be coupled with main latch axles 1278a, and main latch axles 1278a may be coupled with one or more portions of stopper assembly frame, including outboard frame 181a and/or inboard frame 181b, such as via axle brackets 1378a. Each auxiliary latch cylinder 178b may be coupled, at one end, to one of auxiliary latches 176a and 176b, and coupled at the opposite end to a portion of stopper assembly frame 181, including outboard frame 181a and/or inboard frame 181b, such as via auxiliary latch brackets 1176a. Outboard frame 181a may include three inner sides, of which outboard inner side 182 is visible. Each of main latches 175a and 175b, as well as auxiliary latch 176a, may be positioned with respect to one of outboard inner sides 182. Main latches 175a and 175b may be positioned opposite one another, such that main latches 175a and 175b may operate in tandem to grip chain 130. Inboard frame 181b may include one inner side, inboard inner side 183. Auxiliary latch 176b may be positioned with respect to inboard inner side 183. Auxiliary latch 176a may be positioned opposite of auxiliary latch 176b, such that auxiliary latches 176a and 176b may operate in tandem to grip chain 130. Stopper assembly 170 may operate to both grip and support chain 130 and any anchor attached thereto. For example, main latches 175a and 175b may operate to both grip and support chain 130 and any anchor attached thereto, and auxiliary latches 176a and 176b may operate to both grip and support chain 130 and any anchor attached thereto.

Figure 6C:
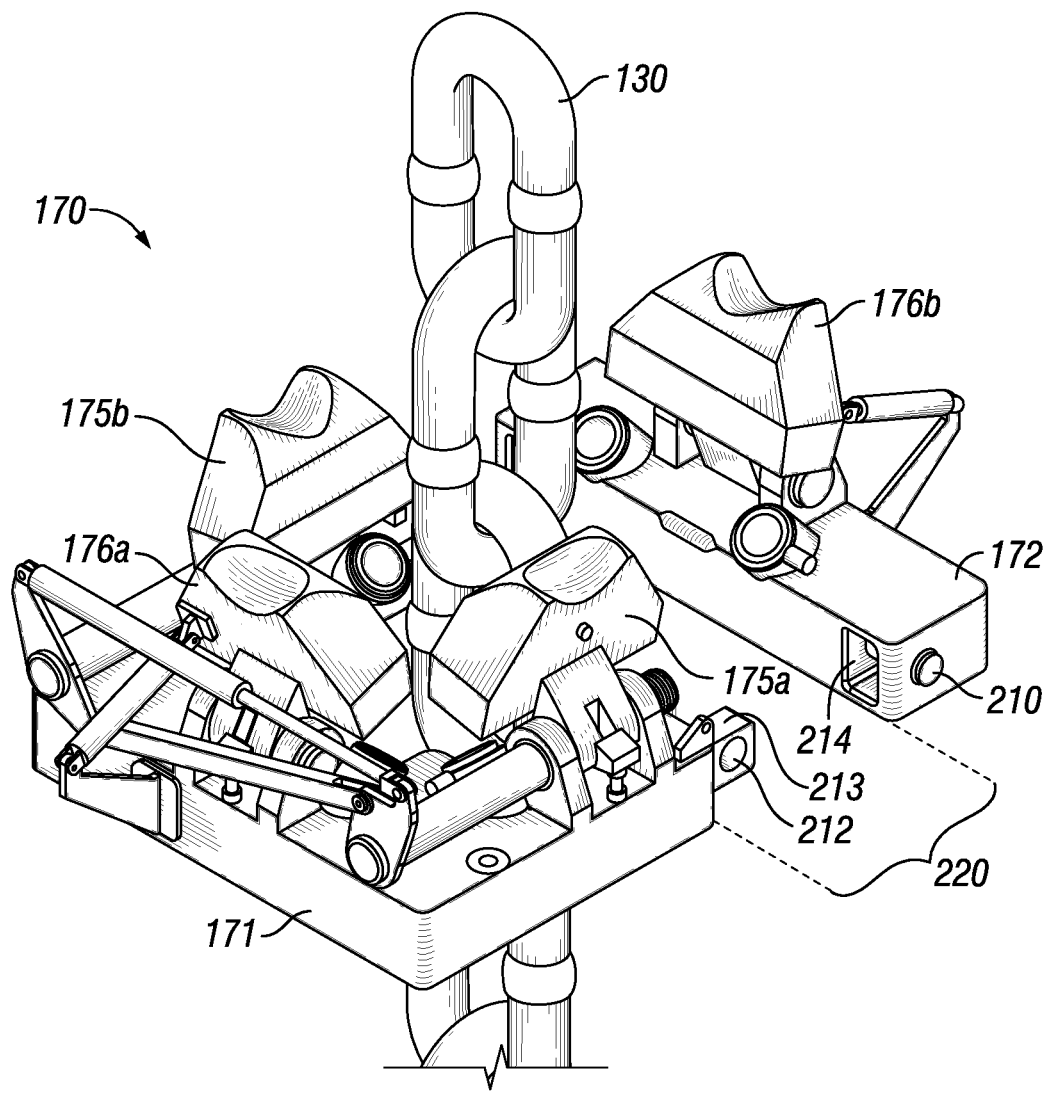

As shown in FIG. 6C, stopper assembly 170 may include a locking mechanism for engagement of outboard stopper assembly 171 with inboard stopper assembly 172, allowing outboard stopper assembly 171 and inboard stopper assembly 172 to be pinned together when in a closed configuration. For example and without limitation, inboard stopper assembly 172 may include tab receptacle 214 and lock pin 210, and outboard stopper assembly 171 may include tab 213 and pin hole 212. When stopper assembly 170 is in the open configuration, as shown in FIG. 5C, tab 213 may be disengaged from within tab receptacle 214, and locking pin 210 may be disengaged from within pin hole 212. When stopper assembly 170 is in the closed configuration, as shown in FIG. 7C, tab 213 may be engaged within tab receptacle 214, and locking pin 210 may be engaged within pin hole 212, thereby locking outboard stopper assembly 171 to inboard stopper assembly 172. While only one locking mechanism is detailed, stopper assembly 170 may have more than one locking mechanism.

With further reference to FIGS. 5A-5C, in operation, inboard stopper assembly 172 may be actuated to move toward outboard stopper assembly 171 to enter into the closed configuration (as shown in FIG. 7B) by actuation of stopper cylinder 179, and inboard stopper assembly 172 may be actuated to move away from outboard stopper assembly 171 to enter into the open configuration (as shown in FIG. 5B) by actuation of stopper cylinder 179. Stopper cylinder 179 may be coupled at one end to inboard stopper assembly 172, and coupled at the opposite end to portion of frame 120b. While stopper assembly 170 is depicted as having inboard stopper assembly 172 movable toward and away from outboard stopper assembly 171, in other embodiments outboard stopper assembly 171 may be movable toward and away from inboard stopper assembly 172, or both inboard stopper assembly 172 and outboard stopper assembly 171 may be movable toward and away from one another. While outboard stopper assembly 171 is shown and described has having two main latches 175a and 175b and one auxiliary latch 176a and inboard stopper assembly 172 is shown and described has having one auxiliary latch 176b and no main latches, stopper assembly 170 is not limited to the configuration shown in FIG. 5C. Each of outboard stopper assembly 171 and inboard stopper assembly 172 may have more or less auxiliary latches and main latches than is shown in FIG. 5C. In a preferred embodiment, at least one pair of opposed latched will be on the same stopper assembly. In still another preferred embodiment, the main latches are on the same stopper assembly.

In operation, during haul-in of messenger chain 150 from outboard of offshore structure 1000, inboard stopper assembly 172 and outboard stopper assembly 171 may be positioned in the open configuration to allow passage of messenger chain 150, shackle 140, and chain 130. Also, during haul-in of messenger chain 150 from outboard of offshore structure 1000, chain wheel latch 191 may be engaged with dual chain wheel 110, and may ratchet as chain wheel 110 rotates.

With reference to FIGS. 6A-6C, rotary chain jack 100 is shown after haul-in of messenger chain 150, with mooring line in transition from being hauled in on inner chain wheel 110b to being hauled in on outer chain wheel 110a. Stopper assembly 170 is maintained in the open configuration with main latches 175a and 175b and auxiliary latches 176a and 176b both disengaged from chain 130, allowing chain 130 to pass there-between, optionally within opening 220 between inboard stopper assembly 172 and outboard stopper assembly 171. In the open configuration, inboard stopper assembly 172 and outboard stopper assembly 171 may be positioned such that opening 220 has dimensions sufficient to allow passage of messenger chain 150, shackle 140, and chain 130 there-through. Also, chain wheel latch 191 is maintained in engagement with dual chain wheel 110, ratcheting as dual chain wheel 110 rotates. Once messenger chain 150 is hauled in but still engaged with inner chain wheel 110b, as shown in FIGS. 6A-6C, shackle 140 may become engaged with teeth 111 of outer chain wheel 110a, as shown in FIG. 6B. After engagement of shackle 140 with teeth 111, further rotation of dual chain wheel 110 will result in the passing of chain 130 over outer chain wheel 110a.

With reference to FIGS. 7A-7C, the configuration of rotary chain jack 100 is shown during haul-in of chain 130 or a final, secured position. After the transition shown and described in FIGS. 6A-6C, chain 130 may be hauled in from outboard of offshore structure 1000. Stopper assembly 170 is positioned in the closed configuration, with inboard stopper assembly 171 engaged to outboard stopper assembly 172 via locking pin 210, as described above. During haul-in of chain 130, main latches 175a and 175b may be positioned in the closed configuration, engaged with chain 130. During haul-in of chain 130, auxiliary latches 176a and 176b may be positioned in the opened configuration, disengaged from chain 130. In operation, while chain 130 is hauled in, main latches 175a and 175b are preferably in ratcheting engagement with links of chain 130, while chain wheel latch 191 is disengaged from dual chain wheel 110. Alternatively, main latches 175a and 175b and auxiliary latches 176a and 176b may be positioned in ratcheting engagement with links of chain 130. Once the mooring chain has been set, the load may be removed from the chain wheel by setting a chain link on either the main or auxiliary latches. The choice of main or auxiliary latches depends on the chain location once the mooring line has been set.

Figure 8B:
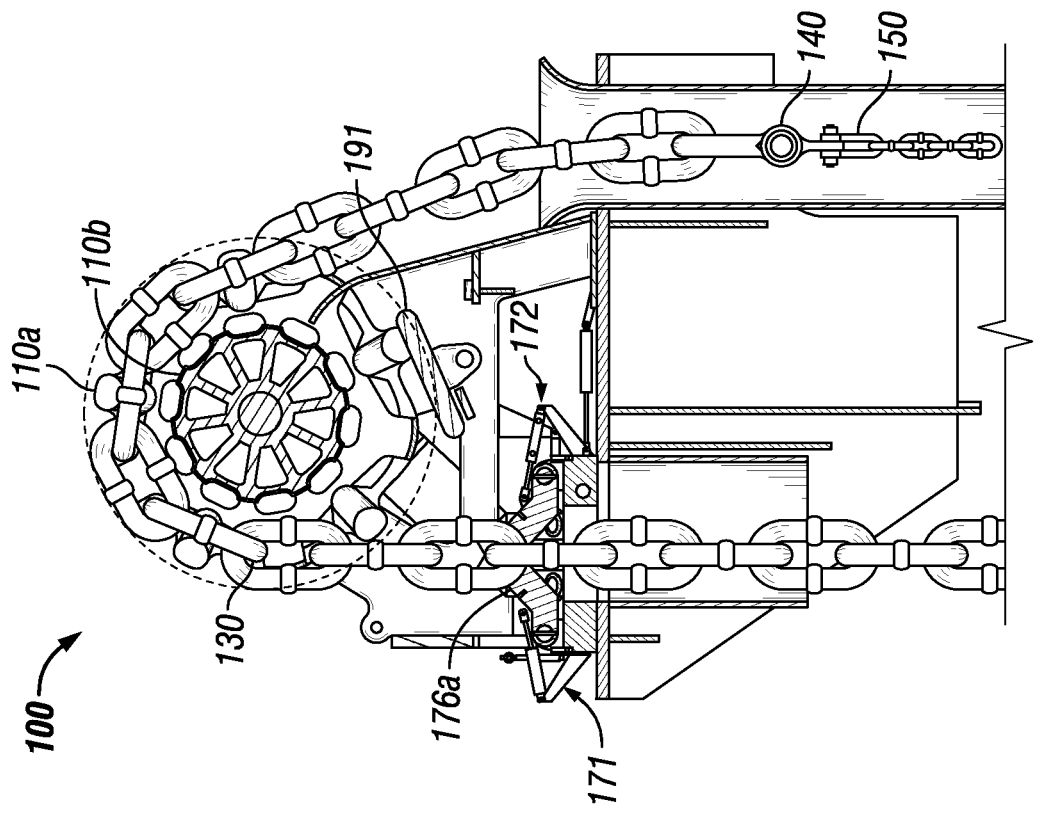
FIG. 8B is a sectional, side view of the rotary chain jack of FIG. 8A.
Figure 8A:
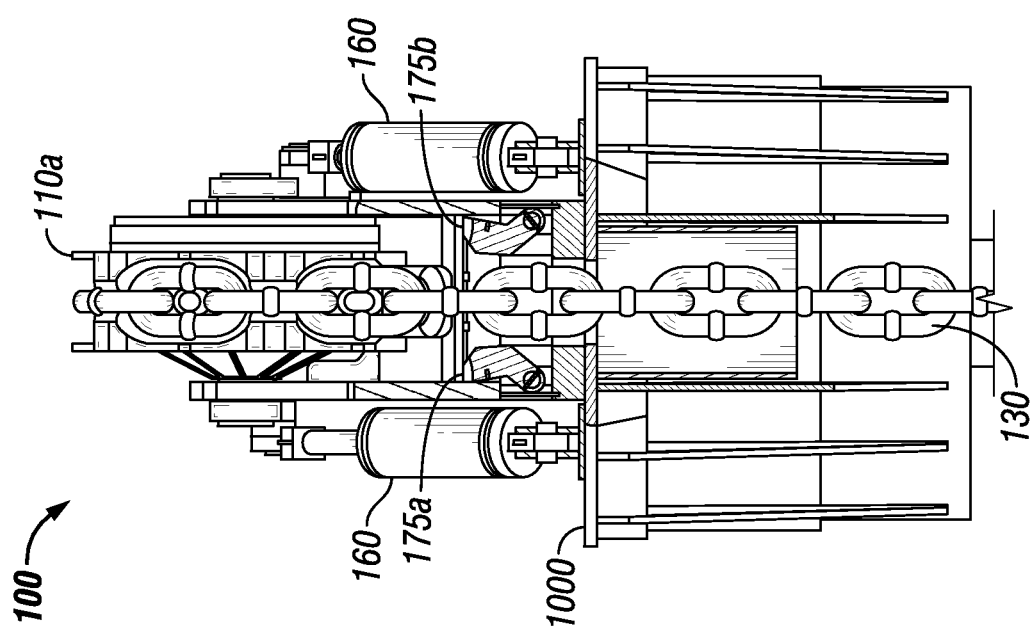
FIG. 8A is a sectional, front view of a rotary chain jack during positioning of the mooring line in accordance with certain embodiments of the present disclosure.
Figure 8C:
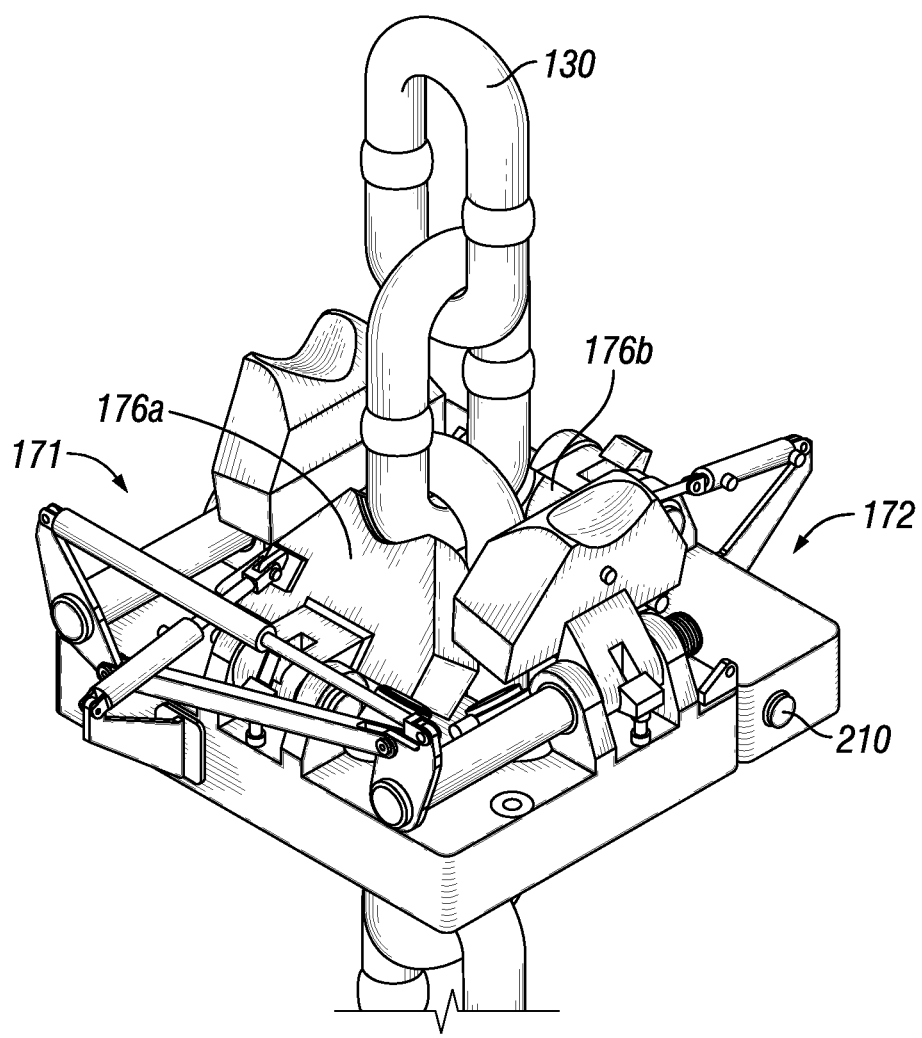
FIG. 8C is a perspective view of the stopper assembly of the rotary chain jack of FIG. 8A, where the stopper assembly is in a closed configuration and auxiliary latches of the stopper assembly are engaged with the top chain of the mooring line.

With reference to FIGS. 8A-8C, rotary chain jack 100 is shown during haul-in or a final, secure position. After hauling in chain 130 as shown and described previously, chain 130 may be positioned. During haul-in or positioning of chain 130, stopper assembly 170 may be maintained in the closed configuration as described with reference to FIG. 7C above. Also, during haul-in or positioning of chain 130, auxiliary latches 176a and 176b may be in a closed configuration, such that auxiliary latches 176a and 176b are engaged with chain 130, and main latches 175a and 175b may be in an open configuration, such that main latches 175a and 175b are disengaged from chain 130. Alternatively, main latches 175a and 175b and auxiliary latches 176a and 176b may be positioned in ratcheting engagement with links of chain 130. During positioning, chain 130 may be hauled in by rotating dual chain wheel 110 while auxiliary latches 176a and 176b are engaged with chain 130, as shown. Also, during positioning of chain 130, chain wheel latch 191 may be disengaged from dual chain wheel 110. Once the mooring chain has been set, the load may be removed from the chain wheel by setting a chain link on either the main or auxiliary latches. The choice of main or auxiliary latches depends on the chain location once the mooring line has been set.

In operation, while chain 130 is hauled in for positioning, auxiliary latches 176a and 176b may be in ratcheting engagement with links of chain 130, while chain wheel latch 191 is disengaged from dual chain wheel 110. Once a target position of chain 130 is reached, chain 130 may be set down upon auxiliary latches 176a and 176b, such that auxiliary latches 176a and 176b close and secure a link of chain 130, maintaining a position of chain 130.

In some embodiments, use of stopper assembly 170 allows for a more precise positioning of chain 130 during mooring of offshore structure 1000 relative to a positioning of chain 130 during mooring of offshore structure 1000 without use of stopper assembly 170.

Figure 9:
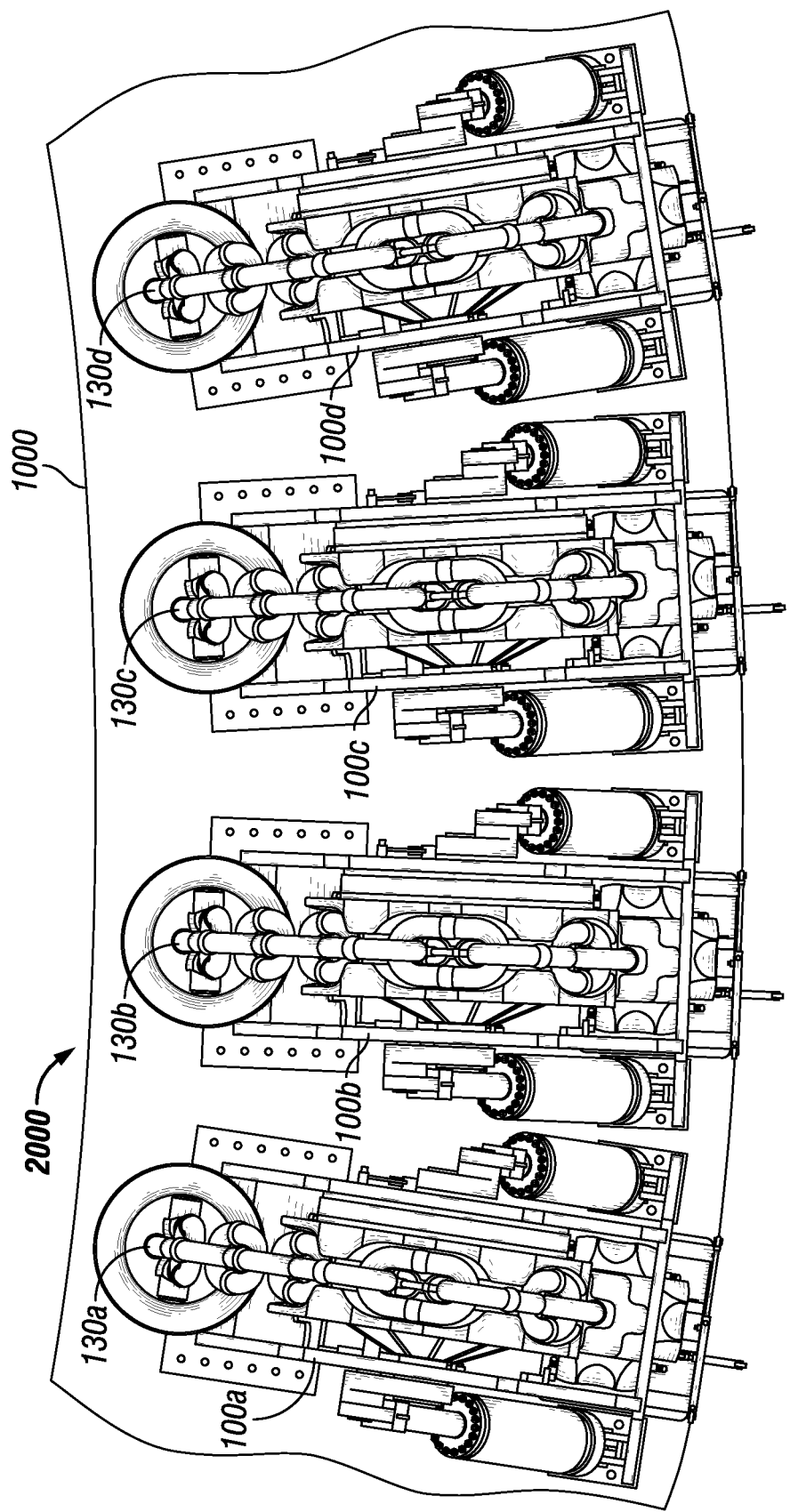
FIG. 9 is a top view of an assembly of multiple rotary chain jacks on a single offshore structure.

With reference to FIG. 9, in some embodiments offshore structure 1000 may have assembly 2000 of one or more rotary chain jacks 100a-100d. While offshore structure 1000 is shown as having four rotary chain jacks 100a-100d, offshore structure 1000 may have any number of rotary chain jacks 100, including more or less than four rotary chain jacks.

Rotary chain jacks 100a-100d may operate to maintain tension in mooring lines, such as chains 130a-130d, of offshore structure 1000 by providing or releasing tension on mooring lines in response to external, e.g. environmental, forces, such as wind, waves and currents, acting upon offshore structure 1000. As such, rotary chain jacks 100a-100d may operate to maintain offshore structure 1000 within specified tolerances.

In some embodiments, each chain 130a-130d may be mechanically coupled with an anchor (not shown). In some embodiments, coupling of rotary chain jacks 100a-100d to chains 130a-130d may proceed by installing anchors on the ocean floor, where the anchors are mechanically coupled to chains 130a-130d. For each rotary chain jack 100a-100d, messenger chain 150 may be fed from the deck of offshore structure 1000 through inner chain wheel 110b to be mechanically coupled with one of chains 130a-130b via shackle 140 or messenger chain 150 may be coupled with one of chains 130a-130b via shackle 140 before being engaged to chain wheels.

Certain embodiments of the present disclosure relate to a method of use of rotary chain jack 100 to position a deployed mooring line, e.g. chain 130, mechanically coupled to messenger chain 150 via shackle 140.

The method may include coupling rotary chain jack 100 to offshore structure 1000, and coupling messenger chain 150 to an anchor chain, e.g. chain 130. Chain 130 may be coupled to an anchor. Messenger chain 150 may be operatively coupled with dual chain wheel 110, such that when dual chain wheel 110 rotates messenger chain 150 is either hauled inboard or fed outboard from offshore structure 1000, depending upon the direction of rotation of dual chain wheel 110.

The method may include positioning chain 130 by rotating dual chain wheel 110 to increase or decrease tension on chain 130, and selectively engaging chain 130 with stopper assembly 170 during positioning of chain 130. Selectively engaging chain 130 with stopper assembly 170 during positioning of chain 130 may include positioning stopper assembly 170 in the closed configuration about chain 130, and gripping chain 130 with one or more latches of stopper assembly 170, i.e. main latches 175a and 175b or auxiliary latches 176a and 176b.

Positioning stopper assembly 170 in the closed configuration about chain 130 may include pinning outboard stopper assembly 171 and inboard stopper assembly 172 together.

With reference to FIGS. 5A-5C, the method may include hauling in messenger chain 150 inboard of offshore structure 1000. Messenger chain 150 may be hauled in by actuating jack cylinders 160, thereby, rotating dual chain wheel 110. While hauling in messenger chain 150, the method may include maintaining inboard stopper assembly 172 and outboard stopper assembly 171 in an open configuration to allow passage of messenger chain 150 and shackle 140 through opening 220 between inboard stopper assembly 172 and outboard stopper assembly 171. Also, while hauling in messenger chain 150, the method may include maintaining chain wheel latch 191 engaged with dual chain wheel 110, and ratcheting the engagement of chain wheel latch 191 with dual chain wheel 110 as dual chain wheel 110 rotates.

With reference to FIGS. 6A-6C, the method may including transitioning from hauling in onto inner chain wheel 110b to hauling in onto outer chain wheel 110a. In operation, after messenger chain 150 is hauled in onto inner chain wheel 110b, a portion of shackle 140, such as shackle tabs 141, may engage with teeth of outer chain wheel 110a. After engagement of shackle 140 with outer chain wheel 110a, further rotation of dual chain wheel 110 by actuation of jack cylinders 160 will result in feeding of chain 130 over outer chain wheel 110a. During and upon transition from hauling in onto inner chain wheel 110b to hauling in onto outer chain wheel 110a, the method may include maintaining inboard stopper assembly 172 and outboard stopper assembly 171 in an open configuration to allow passage of chain 130 through opening 220 between inboard stopper assembly 172 and outboard stopper assembly 171. Also, during and upon transition from hauling in onto inner chain wheel 110b to hauling in onto outer chain wheel 110a, the method may include maintaining chain wheel latch 191 engaged with dual chain wheel 110, and ratcheting the engagement of chain wheel latch 191 with dual chain wheel 110 as dual chain wheel 110 rotates.

With reference to FIGS. 7A-7B, the method may include hauling in chain 130 from outboard to inboard of offshore structure 1000. Chain 130 may be hauled in by actuating jack cylinders 160, thereby, rotating dual chain wheel 110. While hauling in chain 130, the method may include engaging inboard stopper assembly 172 and outboard stopper assembly 171 into a closed configuration, and maintaining inboard stopper assembly 172 and outboard stopper assembly 171 into the closed configuration. Also, while hauling in chain 130, the method may include maintaining auxiliary latches 176a and 176b in an open configuration, and maintaining main latches 175a and 175b in a closed configuration about chain 130. Additionally, while hauling in chain 130, the method may include ratcheting the engagement of main latches 175a and 175b with chain 130. Further, while hauling in chain 130, the method may include maintaining chain wheel latch 190 disengaged from dual chain wheel 110 as dual chain wheel 110 rotates.

With reference to FIGS. 8A-8C, the method may include positioning chain 130 by increasing or decreasing tension on chain 130. Tension on chain 130 may be increased by rotating dual chain wheel 110 in direction 3000. Tension on chain 130 may be decreased by rotating dual chain wheel 110 in direction 4000. While positioning chain 130, the method may include maintaining inboard stopper assembly 172 and outboard stopper assembly 171 in the closed configuration, maintaining main latches 175a and 175b in an open configuration, maintaining auxiliary latches 176a and 176b in a closed configuration, and maintaining chain wheel latch 191 disengaged from dual chain wheel 110. Upon attaining a desired position for chain 130, chain 130 may be set down upon auxiliary latches 176a and 176b for engagement therewith. Auxiliary latches 176a and 176b may maintain chain 130 in the desired position. In the method, use of stopper assembly 170 may allow for precise positioning of chain 130, thereby, allowing for a more precise mooring of offshore structure 1000.

With reference to FIGS. 5C, 6C, 7C and 8C, certain embodiments relate to stopper assembly 170 for use with a chain jack, such as a rotary chain jack, on an offshore vessel. Stopper assembly 170 may be adapted for mechanical coupling with chain jacks. For example and without limitation, stopper assembly 170 may be bolted, pinned, welded, or otherwise coupled to a chain jack via well known methods.

While various elements of rotary chain jack 100 have been described herein as being hydraulically actuated, such as jack cylinders 160, main latches 175a and 175b, auxiliary latches 176a and 176b, stopper cylinder 179, and chain wheel latch 191, one skilled in the art would understand that one or more of these elements may be pneumatically actuated, or actuated by any other well known method.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A rotary chain jack comprising:
a frame;
a chain wheel coupled to the frame; and
a stopper assembly coupled to the frame, the stopper assembly comprising a first stopper frame having at least one latch coupled thereto and a second stopper frame having at least one latch coupled thereto, wherein the first stopper frame is movable toward the second stopper frame into a closed position and is movable away from the second stopper frame into an open position, wherein, in the closed position, the latches of the stopper assembly are selectively movable between a closed configuration of the latches and an open configuration of the latches.

2. The rotary chain jack of claim 1, wherein the stopper assembly comprises an inboard stopper assembly including the first stopper frame having the at least one latch coupled thereto and an outboard stopper assembly including the second stopper frame having the at least one latch coupled thereto, wherein the inboard stopper assembly is movable toward and away from the outboard stopper assembly to selectively position the stopper assembly in the open position or the closed position;
wherein, when the stopper assembly is in the closed position, the latches are positioned to selectively move between the closed and open configurations of the latches to selectively grip a chain; and
wherein, when the stopper assembly is in the open position, an opening is formed between the inboard stopper assembly and the outboard stopper assembly that has dimensions sufficient to allow passage of the chain there-through.

3. The rotary chain jack of claim 1, further comprising one or more jack cylinders coupled with the chain wheel, wherein the jack cylinders are adapted to rotate the chain wheel.

4. The rotary chain jack of claim 1, further comprising a chain engaged with the chainwheel, wherein a top link of the chain is coupled with a shackle, and wherein the shackle is coupled with a messenger chain that is coupled to the chain wheel.

5. The rotary chain jack of claim 4, wherein the shackle comprises shackle tabs adapted engage teeth of the chain wheel.

6. The rotary chain jack of claim 1, wherein the chain wheel is a dual chain wheel comprising an outer chain wheel coupled with an inner chain wheel, wherein the outer chain wheel has a larger diameter than the inner chain wheel.

7. The rotary chain jack of claim 6, wherein the inner chain wheel is adapted to engage a messenger chain coupled with a chain via a shackle to allow the messenger chain to pass there-over, and wherein the outer chain wheel is adapted to engage the chain to allow the chain to pass there-over.

8. The rotary chain jack of claim 1, further comprising a chain wheel latch adapted to engage and disengage with the chain wheel, wherein, when the chain wheel latch is engaged with the chain wheel, the chain wheel latch ratchets as the chain wheel rotates.

9. A method for mooring an offshore structure, the offshore structure including a rotary chain jack, the rotary chain jack including a frame, a chain wheel rotatably coupled to the frame, and a stopper assembly coupled to the frame, the stopper assembly including a first stopper frame having at least one latch coupled thereto and a second stopper frame having at least one latch coupled thereto, wherein the first stopper frame is movable toward the second stopper frame into a closed position and away from the second stopper frame into an open position, the method comprising:
coupling a messenger chain to an anchor chain, wherein the anchor chain is coupled to an anchor, and wherein the messenger chain is coupled to the chain wheel;
with the first stopper frame moved away from the second stopper frame into the open position, positioning the anchor chain by rotating the chain wheel to increase or decrease tension on the anchor chain; and
moving the first stopper frame toward the second stopper frame into the closed position, and, after moving the first and second stopper frames into the closed position, closing the latches to engage the latches with the anchor chain.

10. A stopper assembly for use with a chain jack for mooring an offshore structure, the stopper assembly comprising:
an inboard stopper assembly comprising an inboard frame having one or more latches coupled thereto;
an outboard stopper assembly comprising an outboard frame having one or more latches coupled thereto;
wherein at least one of the inboard stopper assembly and the outboard stopper assembly is movable toward the other of the inboard stopper assembly and the outboard stopper assembly to position the stopper assembly in an open position, and is movable away from the other of the inboard stopper assembly and the outboard stopper assembly to position the stopper assembly in a closed position; and
wherein, when the stopper assembly is in the closed position, the latches are positioned to close or open.

11. The stopper assembly of claim 10, wherein the latches of the stopper assembly comprise at least two main latches and at least two auxiliary latches.

12. The stopper assembly of claim 11, wherein the outboard frame has three inner sides, wherein a first main latch is positioned on the outboard frame adjacent a first inner side, wherein a second main latch is positioned on the outboard frame adjacent a second inner side opposite the first main latch, and wherein a first auxiliary latch is posited on the outboard frame adjacent a third inner side of the outboard frame.

13. The stopper assembly of claim 12, wherein the inboard frame has one inner side, wherein a second auxiliary latch is positioned on the inboard frame adjacent the inner side of the inboard frame, and wherein the second auxiliary latch is positioned opposite the first auxiliary latch in the stopper assembly.

14. The stopper assembly of claim 13, wherein the main latches are adapted to operate in tandem with one another to grip an anchor chain, and wherein the auxiliary latches are adapted to operate in tandem with one another to grip an anchor chain.

15. The stopper assembly of claim 10, wherein the latches of the stopper assembly are configured to be hydraulically actuated.

16. The stopper assembly of claim 10, wherein each latch of the stopper assembly comprises a gripping surface.

17. The stopper assembly of claim 16, wherein each gripping surface is a concave surface formed into the latches that is shaped and arranged to engage about and grip an anchor chain.

18. The stopper assembly of claim 10, wherein the outboard stopper assembly and inboard stopper assembly are configured to be pinned together when in the closed configuration.

19. The stopper assembly of claim 18, wherein the inboard stopper assembly comprises a tab receptacle and lock pin, the outboard stopper assembly comprises a tab and a pin hole;
- wherein, when the stopper assembly is in the open position, the tab is disengaged from within the tab receptacle and the locking pin is disengaged from within the pin hole; and
- wherein, when the stopper assembly is in the closed position, the tab is engaged within the tab receptacle and the locking pin is engaged within the pin hole.

20. The stopper assembly of claim 10, wherein, when the stopper assembly is in the open position, an opening is formed between the inboard stopper assembly and the outboard stopper assembly that has dimensions sufficient to allow passage of an anchor chain there-through.

21. The stopper assembly of claim 10, wherein the stopper assembly is adapted to grip and support an anchor chain.

22. The stopper assembly of claim 10, wherein the inboard stopper assembly adapted to be hydraulically actuated to move toward the outboard stopper assembly to enter into the closed position, and to be hydraulically retracted to move away from the outboard stopper assembly to enter into the open position.

23. The stopper assembly of claim 11, wherein the main latches are adapted to grip an anchor chain in ratcheted engagement during haul-in of an anchor chain, and wherein the auxiliary latches are adapted to grip and support an anchor chain in ratcheted engagement to maintain a position thereof.

24. The rotary chain jack of claim 1, further comprising a hydraulic cylinder coupled between the frame of the rotary chain jack and the first stopper frame, the hydraulic cylinder actuable to move the first stopper frame toward and away from the second stopper frame.

25. The rotary chain jack of claim 1, wherein, when the first stopper frame is moved toward the second stopper frame, the first stopper frame and the second stopper frame are engaged, and wherein when the first stopper frame is moved away from the second stopper frame, the first stopper frame and the second stopper frame are disengaged.

26. The rotary chain jack of claim 25, further comprising a locking mechanism that locks the first stopper frame with the second stopper frame when the first stopper frame is engaged with the second stopper frame.

27. The rotary chain jack of claim 1, wherein the stopper assembly is positioned relative to a chain engaged with the chainwheel such that, in the closed position of the stopper assembly, the latches are positioned to close to grip the chain and to open to disengage from the chain; and such that, in the open position of the stopper assembly, the latches are positioned to remain disengaged from the chain.

* * * * *